US006451933B1

(12) United States Patent
Nagy

(10) Patent No.: US 6,451,933 B1
(45) Date of Patent: Sep. 17, 2002

(54) BIMETALLIC OLEFIN POLYMERIZATION CATALYSTS

(75) Inventor: Sandor Nagy, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 167 days.

(21) Appl. No.: 09/713,975

(22) Filed: Nov. 16, 2000

(51) Int. Cl.$^7$ .................................................. C08F 4/72
(52) U.S. Cl. ..................... 526/113; 526/114; 526/115; 526/116; 526/160; 502/113; 502/103
(58) Field of Search .................................. 526/113, 114, 526/115, 116, 160; 502/113, 103

(56) References Cited

U.S. PATENT DOCUMENTS 5,753,785 A    5/1998   Reddy et al. ................... 526/75

FOREIGN PATENT DOCUMENTS

| WO | WO 01/25298 A1 | | 4/2001 |
|----|----------------|---|--------|
| WO | WO0125298 A1 | * | 4/2001 |

OTHER PUBLICATIONS

R. Broussier et al., *Journal of Organometallic Chemistry*, 598 (2000) pp. 365–373.
K. Kloc, et al., *Heterocycles*, vol. 9, No. 7, 1978.
Bartmann, et al., *Angew. Chem. Int. Ed. Eng.*, vol. 23, (1984), pp. 225–226.

* cited by examiner

*Primary Examiner*—David W. Wu
*Assistant Examiner*—William Cheung
(74) *Attorney, Agent, or Firm*—Kevin M. Carroll

(57) ABSTRACT

A bimetallic olefin polymerization catalyst is described. The catalyst comprises an organometallic compound, and optionally, an activator. The organometallic compound comprises a Group 3–5 transition or lanthanide metal, $M_1$, a Group 6–10 transition metal, $M_2$, and a multidentate ligand characterized by a cyclopentadienyl group that is covalently linked to two Group 15 atoms, wherein the cyclopentadienyl group is $\pi$-bonded to $M_1$ and the two Group 15 atoms are coordinated to $M_2$. The bimetallic catalyst is useful for producing copolymers from ethylene without using a co-monomer by oligomerizing ethylene and simultaneously polymerizing ethylene and the co-formed oligomer.

8 Claims, No Drawings

BIMETALLIC OLEFIN POLYMERIZATION CATALYSTS

FIELD OF THE INVENTION

This invention relates to a catalyst for polymerizing olefins. The catalyst comprises an organometallic compound and optionally, an activator. The organometallic compound is a bimetallic complex comprising a Group 3–5 transition or lanthanide metal, a Group 6–10 transition metal, and a multidentate ligand.

BACKGROUND OF THE INVENTION

Many olefin polymerization catalysts are known, including conventional Ziegler-Natta catalysts. To improve polymer properties, highly active single-site catalysts, in particular metallocenes, are beginning to replace Ziegler-Natta catalysts. These catalysts have proved very useful in producing linear low density polyethylene (LLDPE) by the co-polymerization of ethylene with a co-monomer such as butene, hexene, or octene.

Because the co-monomer used to produce LLDPE is typically much more expensive than ethylene, it would be useful to develop a catalyst or process that is capable of producing LLDPE from ethylene without the use of a co-monomer. U.S. Pat. No. 5,753,785 discloses a metallocene catalyst that promotes simultaneous oligomerization of a fraction of ethylene to form a comonomer in situ and copolymerization of the remaining ethylene and the comonomer to produce a copolymer. However, only one of the disclosed metallocene catalysts was found to be effective in dimerization of ethylene followed by polymerization to give ethylene/butylene copolymers.

In sum, new catalysts are needed. Particularly valuable catalysts would be able to produce LLDPE resins from ethylene by oligomerizing ethylene and simultaneously polymerizing ethylene and the co-formed oligomer.

SUMMARY OF THE INVENTION

The invention is a catalyst for polymerizing olefins. The catalyst comprises an organometallic compound comprising a Group 3–5 transition or lanthanide metal, $M_1$, a Group 6–10 transition metal, $M_2$, and a multidentate ligand characterized by an anionic cyclopentadienyl group that is covalently linked to two Group 15 atoms, wherein the cyclopentadienyl group is π-bonded to $M_1$ and the two Group 15 atoms are coordinated to $M_2$. The catalyst may optionally comprise an activator.

DETAILED DESCRIPTION OF THE INVENTION

Catalysts of the invention comprise an organometallic compound and optionally, an activator. The organometallic compound of the invention comprises a Group 3–5 transition or lanthanide metal, $M_1$, a Group 6–10 transition metal, $M_2$, and a multidentate ligand. The multidentate ligand is characterized by an anionic cyclopentadienyl group that is covalently linked to two Group 15 atoms, wherein the cyclopentadienyl group is π-bonded to $M_1$ and the two Group 15 atoms are coordinated to $M_2$.

The multidentate ligand of the invention contains a cyclopentadienyl group. The cyclopentadienyl group can be any substituted or unsubstituted cyclopentadienyl. The cyclopentadienyl group can also be a part of a condensed ring system, such as a fluorenyl type ring system.

The multidentate ligand also contains two Group 15 atoms that are covalently linked to the cyclopentadienyl group. The two Group 15 atoms may be the same or different. Preferred Group 15 atoms include nitrogen and phosphorus. Nitrogen is particularly preferred. Depending upon the structure of the multidentate ligand, the Group 15 atoms may be bonded to other substituents. Preferred Group 15 atom substituents include $C_1$–$C_{20}$ alkyl, $C_6$–$C_{20}$ aryl and trialkyl silyl.

The cyclopentadienyl group is covalently linked to the two Group 15 atoms. The cyclopentadienyl and the two Group 15 atoms can be bonded directly to each other or linked through a bridging group. If linked through a bridging group, the bridging group contains at least one nonhydrogen atom. The two Group 15 atoms may form part of a ring system that also contains the cyclopentadienyl group, for example in substituted and unsubstituted diazafluorenyls ligands.

A preferred multidentate ligand has the formula:

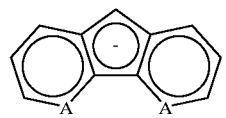

where
A is N or P.
Another preferred multidentate ligand has the formula:

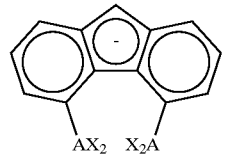

where
A is N or P, and X is selected from the group consisting of $C_{1-10}$ alkyl, $C_{6-20}$ aryl, or trialkyl silyl.

The multidentate ligands can be prepared by a variety of known synthetic procedures. See, for example, Kloc, et al., *Heterocycles* (1978), Vol. 9, 849 for the synthesis of diazafluorenes; Broussier, et al., *J. Organomet. Chem.* (2000), Vol. 598, 365 for the preparation of diphosphinocyclopentadienes; and Bartmann, et al., *Angew. Chem. Int. Ed. Eng.* (1984), Vol. 23, 225 for the synthesis of triaminocyclopentadienes.

The organometallic compound of the invention also comprises a Group 3–5 transition or lanthanide metal, $M_1$. $M_1$ is π-bonded to the cyclopentadienyl group of the multidentate ligand in an $\eta^5$ fashion. $M_1$ is preferably a Group 4 transition metal; most preferably, titanium or zirconium.

The Group 3–5 transition or lanthanide metal, $M_1$, may also be associated with other ligands. Preferred ligands include halides, substituted or unsubstituted cyclopentadienyl, and $C_1$–$C_{20}$ alkoxy, siloxy, hydrocarbyl, or dialkylamido ligands. Preferred ligands also include an additional multidentate ligand. Particularly preferred ligands are cyclopentadienyl, halides, and $C_1$–$C_{20}$ hydrocarbyl or dialkylamido ligands. If the ligand is a $C_1$–$C_{20}$ hydrocarbyl group, it is preferably a group that lacks a hydrogen atom on a carbon that is beta to M. Thus, preferred hydrocarbyl groups include methyl, benzyl, phenyl, neopentyl, or the like.

The organometallic compound of the invention also comprises a Group 6–10 transition, $M_2$. $M_2$ is chelated by the two Group 15 atoms of the multidentate ligand. $M_2$ is preferably a Group 10 transition metal such as nickel, palladium, or platinum. The Group 6–10 transition metal, $M_2$, may also be associated with other ligands. Preferred ligands include halides (e.g., chlorides, bromides), $C_1$–$C_{20}$ alkyls, $C_6$–$C_{20}$ aryls, amines, acetylacetonates, nitrates, sulfates, and carboxylates (e.g. acetate).

The organometallic compound is prepared by any suitable method. In one convenient method, the multidentate ligand is formed by reacting a multidentate precursor with one equivalent of a deprotonating base such as butyl lithium in an inert organic solvent. The multidentate precursor is characterized by a neutral cyclopentadiene group that is covalently linked to two Group 15 atoms. The deprotonated reaction product is then reacted with a Group 3–5 transition or lanthanide metal starting complex in an inert organic solvent to form an intermediate where $M_1$ is now π-bonded to the cyclopentadienyl ring of the multidentate ligand. The Group 3–5 transition or lanthanide metal starting complex includes a Group 3–5 transition or lanthanide metal that is covalently bound to at least one leaving group (such as a halide). The leaving group is any monoanionic species such as halide or amide. Stoichiometric quantities are typically used. The intermediate product is then reacted with a Group 6–10 transition metal starting complex to form the organometallic compound of the invention. The Group 6–10 transition metal complex includes any Group 6–10 transition metal that is coordinatively bound to at least one leaving group. The leaving group of the second complex is any neutral species capable of being disassociated by reaction with the intermediate. Typical leaving groups include cyclooctadiene, phosphines, amines, and the like. Stoichiometric quantities are typically used.

Alternatively, the organometallic compound is prepared by reacting the multidentate precursor compound with the Group 6–10 transition metal starting complex, followed by deprotonation, and reaction with the Group 3–15 transition or lanthanide metal complex. The organometallic compound is typically collected by filtration.

Suitable deprotonating bases include any base that is capable of deprotonating a cyclopentadiene precursor to form an anionic cyclopentadienyl compound. Preferred bases include alkyl lithiums, Grignard reagents, lithium dialkylamides, and metal hydrides. Particularly preferred bases include n-butyl lithium, methylmagnesium bromide, and lithium diisopropylamide.

Suitable inert organic solvents are inert to the deprotonating agent. Preferred solvents include diethyl ether, tetrahydrofuran, hexane, and toluene.

The organometallic compound is optionally combined with an activator to give a catalyst of the invention. Suitable activators include alumoxanes. Preferred alumoxanes are polymeric aluminum compounds represented by the cyclic formula $(R^2—Al—O)_s$ or the linear formula $R^2(R^2—Al—O)_sAlR^2$ wherein $R^2$ is a $C_1$–$C_5$ alkyl group and s is an integer from 1 to about 20. Preferably, $R^2$ is methyl and s is from about 4 to about 10. Exemplary alumoxane activators are (poly)methylalumoxane (MAO), ethylalumoxane, and diisobutylalumoxane. Optionally, the alumoxane activator is used with a trialkyl or triaryl aluminum compound, which preferably has the formula $AlR^3_3$ where $R^3$ denotes a $C_1$–$C_{20}$ hydrocarbyl.

Suitable activators also include substituted or unsubstituted trialkyl or triaryl boron derivatives, such as tris(perfluorophenyl)borane, and ionic borates and aluminates such as tri(n-butyl)ammonium tetrakis(pentafluorophenyl)borate, trityl tetrakis(pentafluorophenyl)borate or trityl tetrakis(pentafluorophenyl)aluminate. The ionic borates and aluminates ionize the neutral organometallic compound to produce an active catalyst for olefin polymerization. See, for instance, U.S. Pat. Nos. 5,153,157, 5,198,401, and 5,241,025, all of which are incorporated herein by reference.

The organometallic compound and, optionally, the activator may be used with a support such as silica, alumina, magnesia, or titania. A support may be required for some processes. For example, a support is generally needed in gas phase and slurry polymerization processes to control polymer particle size and to prevent fouling of the reactor walls. In one method, the organometallic compound is dissolved in a solvent and is deposited onto the support by evaporating the solvent. An incipient wetness method can also be used. The activator can also be deposited on the support or it can be introduced into the reactor separately from the supported organometallic compound.

The catalyst is particularly valuable for polymerizing ethylene.

The organometallic compound and, optionally, the activator are injected into a reactor containing ethylene. The organometallic compound and the activator can be premixed before injecting into the reactor. Alternatively, the organometallic compound and the activator, if used, can be injected separately. If the organometallic compound and the activator are injected separately into the reactor, the activator is preferably injected first. The molar ratio of activator to organometallic compound is preferably from about 1:1 to about 15,000:1.

The catalysts can be used in a variety of polymerization processes. They can be used in a liquid phase (slurry, solution, suspension, bulk), high-pressure liquid phase, or gas phase polymerization processes, or a combination of these. The pressure in the polymerization reaction zones typically ranges from about 15 psia to about 15,000 psia, and the temperature usually ranges from about –100° C. to about 300° C.

The following examples merely illustrate the invention. Those skilled in the art will recognize many variations that are within the spirit of the invention and scope of the claims.

EXAMPLE 1

This example describes the synthesis of $PdCl_2$(N,N-diazafluorenyl)zirconium(cyclopentadienyl)dichloride of the structural formula:

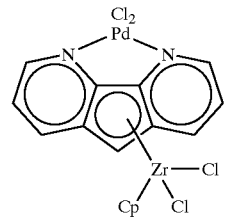

Diazafluorene is prepared according to Kloc, et al., *Heterocycles*, (1978) Vol. 9, 849. Diazafluorene (0.22 g) and (cyclooctadiene)$PdCl_2$ (0.374 g) are combined in methylene chloride (20 mL) and stirred overnight at room temperature. An orange solid precipitate is separated by filtration (0.39 g of (Diazafluorene)$PdCl_2$). To a mixture of (Diazafluorene)$PdCl_2$ (0.10 g, 0.29 mmol) and (cyclopentadienyl)zirconium trichloride (0.076 g, 0.29 mmol) in diethyl ether (40 mL), a 1.7 M t-butyllithium solution in hexane (0.171 mL) is slowly added to the solution dropwise by syringe. The reaction mixture is stirred overnight. The green solid precipitate is then filtered from solution to give the bimetallic catalyst (0.105 g), which is used in polymerization experiments without further purification.

EXAMPLE 2

Ethylene Polymerization

In this example, ethylene is polymerized using the catalyst of Example 1. The polymerization is conducted in a stirred 2-liter stainless steel autoclave at 70° C. Dry isobutane (840 mL) is charged to the dry, oxygen-free reactor. The reactor is then heated to 70° C. and sufficient ethylene is added to bring the reactor pressure to 350 psig. A solution of the catalyst of Example 1 and PMAO (0.004 g catalyst in 1 mL of PMAO, 30% PMAO in toluene from Akzo) is injected into the reactor. After one hour, the ethylene flow is stopped, the reactor is rapidly cooled to room temperature, and volatiles are purged with nitrogen.

The catalyst activity is 22.4 kg polyethylene/g Zr/h. $T_m$ (DSC)=133 and $MI_2$<0.1. The number of short-chain branches as measured by IR techniques is 3.3/1000. The narrow distribution with the high branching indicates that these catalysts are capable of producing copolymers from ethylene by oligomerizing ethylene and simultaneously polymerizing ethylene and the co-formed oligomer.

I claim:

1. A catalyst which comprises:
   (a) an organometallic compound comprising a Group 3–5 transition or lanthanide metal, $M_1$, a Group 6–10 transition metal, $M_2$, and a multidentate ligand characterized by a cyclopentadienyl group that is covalently linked to two selected from the group consisting of nitrogen and phosphorus Group 15 atoms, wherein the cyclopentadienyl group is π-bonded to $M_1$ and the two Group 15 atoms are coordinated to $M_2$; and
   (b) optionally, an activator.

2. The catalyst of claim 1 wherein the activator is selected from the group consisting of alumoxanes, alkylaluminum compounds, alkyl and arylboranes, ionic borates, and ionic aluminates.

3. The catalyst of claim 1 wherein $M_1$ is a Group 4 transition metal.

4. The catalyst of claim 1 wherein $M_2$ is selected from the group consisting of nickel, palladium, and platinum.

5. The catalyst of claim 1 wherein the multidentate ligand has the formula:

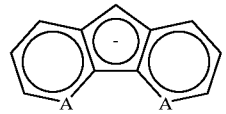

wherein A is a Group 15 atom.

6. The catalyst of claim 1 wherein the multidentate ligand has the formula:

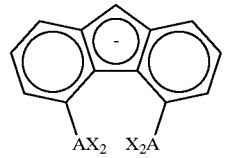

wherein A is a Group 15 atom and X is selected from the group consisting of halide, $C_{1-10}$ alkyl $C_{6-20}$ aryl, and $C_{1-10}$ alkoxide.

7. A supported catalyst of claim 1.

8. A method which comprises polymerizing ethylene in the presence of the catalyst of claim 1.

* * * * *